US009642154B2

(12) United States Patent
Makhlouf et al.

(10) Patent No.: US 9,642,154 B2
(45) Date of Patent: May 2, 2017

(54) UPLINK BROADBAND SCHEDULING IN THE PRESENCE OF NARROWBAND INTERFERENCE

(71) Applicant: MOTOROLA SOLUTIONS, INC, Schaumburg, IL (US)

(72) Inventors: Isam R Makhlouf, Lake Zurich, IL (US); Xiaowei Jin, Inverness, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 191 days.

(21) Appl. No.: 14/608,581

(22) Filed: Jan. 29, 2015

(65) Prior Publication Data
US 2016/0227550 A1    Aug. 4, 2016

(51) Int. Cl.
| H04W 4/00 | (2009.01) |
| H04W 72/12 | (2009.01) |
| H04L 1/00 | (2006.01) |
| H04L 5/00 | (2006.01) |

(52) U.S. Cl.
CPC ....... H04W 72/1226 (2013.01); H04L 1/0027 (2013.01); H04L 5/00 (2013.01)

(58) Field of Classification Search
CPC ... H04L 5/0055; H04L 1/1861; H04L 5/0053; H04L 5/14; H04L 1/18; H04L 5/0057; H04L 1/0072; H04W 72/0406; H04W 72/0413; H04W 76/048; H04W 72/00; H04W 72/0446; H04W 88/02; H04W 88/08
See application file for complete search history.

(56) References Cited

U.S. PATENT DOCUMENTS

| 6,807,405 B1 | 10/2004 | Jagger et al. |
| 2002/0054610 A1 | 5/2002 | Reusens et al. |
| 2007/0105520 A1 | 5/2007 | Van Houtum |
| 2008/0159323 A1* | 7/2008 | Rinne ............... H04L 1/0004 370/431 |

(Continued)

FOREIGN PATENT DOCUMENTS

| CN | 102355718 A1 | 2/2012 |
| CN | 102869109 B | 1/2013 |

(Continued)

OTHER PUBLICATIONS

Intellectual Property Office, Application No. GB1601458.1, date of search: Jun. 29, 2016, all pages.

Primary Examiner — Michael J Moore, Jr.
(74) Attorney, Agent, or Firm — Daniel R. Bestor (57) ABSTRACT

A method and apparatus for uplink scheduling in the presence of narrowband interference on, for instance, a long term evolution (LTE) network. The uplink scheduling is carried out by a scheduler at a base station (e.g., an eNodeB) that receives allocation requests from user equipment (UEs) and assigns resource blocks in the shared channel to the UEs. The scheduler identifies high-interference resource blocks (RBs) in the shared communications channel. The scheduler assigns UEs to portions of the shared channel having high-interference RBs if the error rate expected to result from the assignment falls at or below an error rate threshold. If the expected error rate is greater than the error rate threshold, the scheduler assigns the UE to another portion of the shared channel.

15 Claims, 8 Drawing Sheets

(56) References Cited

U.S. PATENT DOCUMENTS

| | | | |
|---|---|---|---|
| 2008/0242339 A1 | 10/2008 | Anderson | |
| 2011/0085629 A1 | 4/2011 | Lindoff et al. | |
| 2011/0242990 A1* | 10/2011 | Simonsson | H04W 72/085 370/242 |
| 2012/0076103 A1* | 3/2012 | Dai | H04W 72/1289 370/329 |
| 2013/0064197 A1 | 3/2013 | Novak et al. | |
| 2013/0195023 A1 | 8/2013 | Vaisanen et al. | |
| 2014/0133343 A1* | 5/2014 | Lee | H04B 7/04 370/252 |
| 2014/0256336 A1 | 9/2014 | Manssour et al. | |
| 2015/0126239 A1* | 5/2015 | Kim | H04W 52/143 455/522 |
| 2015/0365206 A1* | 12/2015 | Yaacoub | H04L 5/0035 370/329 |

FOREIGN PATENT DOCUMENTS

| | | |
|---|---|---|
| EP | 2288217 A2 | 2/2011 |
| WO | 2013173673 A2 | 11/2013 |

* cited by examiner

UPLINK BROADBAND SCHEDULING IN THE PRESENCE OF NARROWBAND INTERFERENCE

BACKGROUND OF THE INVENTION

Scheduling and allocation of resources is one important aspect of wireless cellular networks. The component that performs such scheduling in a base station is often referred to as a "scheduler." In general terms, a scheduler may assign particular portions of a shared communication channel to different user devices or user equipment (UEs). In a shared uplink communication channel in the Long Term Evolution (LTE) communication protocol, these portions are referred to as resource blocks (RBs). In some instances, one or more RBs may experience high levels of interference from, for example, sources of electromagnetic radiation such as broadcast TV and radio.

Accordingly, there is a need for improved methods and devices of uplink scheduling in the presence of narrowband interference.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

The apparatus and method components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

DETAILED DESCRIPTION OF THE INVENTION

Embodiments of the invention include scheduling end devices to portions of a shared communication channel having high-interference resource blocks such that data throughput is increased and data is not lost or corrupted beyond a correctable level, e.g., via forward error correction (FEC).

In the description that follows, it should be noted that a UE may sometimes be referred to as an "end device" or, in a personified manner, as a "user."

Figure 1:
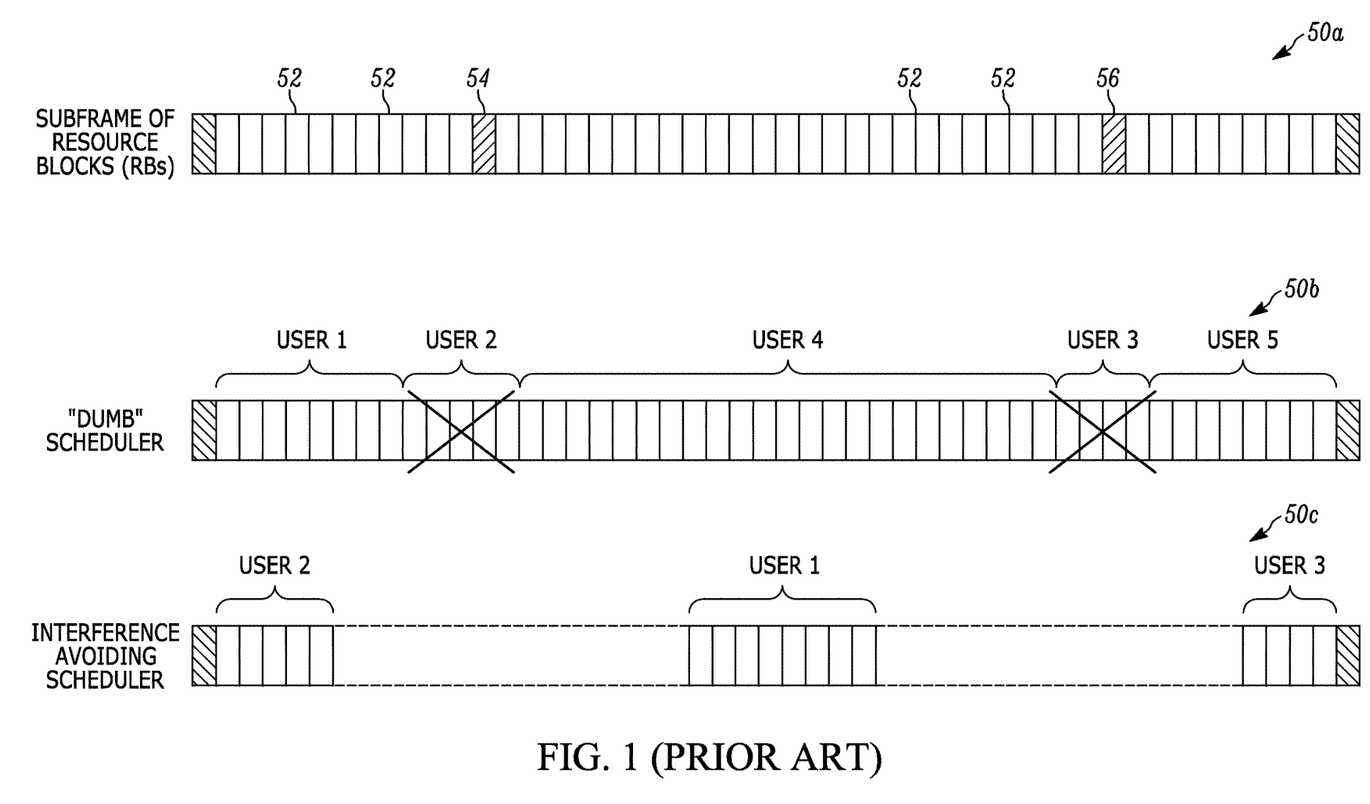
FIG. 1 illustrates a prior art mechanism for allocation of sub-frame resources to end devices.

FIG. 1 illustrates an exemplary sub-frame 50a of a shared communication channel including RBs 52. Within the sub-frame 50a, two of the RBs 52 have high-interference, namely RBs 54 and 56. In certain currently available systems, a scheduler does not identify or account for the interference and allocates RBs with high levels of interference to UEs for communication. The fidelity of such communication may be compromised by the interference. This type of scheduler may be referred to as a "dumb scheduler." An example of scheduling of RBs 52 by a dumb scheduler is represented by sub-frame 50b. As shown, UEs or users 1-5 are each allocated a non-overlapping portion of contiguous RBs 52. User 2 is allocated a portion that includes the high-interference RB 54 and user 3 is allocated another portion including the high-interference RB 56. Since the user 2 and user 3 allocations are relatively small, the high-interference RBs 54 and 56 have a proportionally large impact on the communications of users 2 and 3, resulting in lost or corrupted data.

In certain other currently available systems, a scheduler detects and avoids the use of RBs that have relatively high levels of interference. In some instances, RBs surrounding the high-interference RBs 54 and 56 are also avoided. This type of scheduler may be referred to as an "interference avoiding scheduler." Avoiding high-interference RBs helps maintain the fidelity of the information or signal from the UE, but it reduces the throughput of the shared communication channel. An example of scheduling RBs 52 by an interference avoiding scheduler is represented by sub-frame 50c. As shown, users 1, 2, and 3 are each allocated a set or group of RBs. None of the groups of RBs includes either of the high-interference RBs 54 or 56. However, many of the RBs 52 are not allocated (or avoided) in the sub-frame 50c. As a consequence, much of the available channel capacity is unused and users 4 and 5 are not able to be scheduled in the sub-frame 50c.

Another approach to handling interference includes using a notch filter to mitigate interference. When used with an interference avoiding scheduler, the notch filter influences the scheduler to use high-interference RBs. The notch filter conditions a signal received at a base station to filter out signals at a particular bandwidth (e.g., associated with a high interference RB). Both interference and desired communication signals at the particular bandwidth are filtered out. As a result, the frequency band associated with an RB will in many cases no longer experience an interference level that the scheduler uses to identify high-interference RBs. Thus, the scheduler will allocate at least some high-interference RBs to users. However, the data in those high-interference RBs is filtered out (i.e., lost) by the notch filter, leading to a similar result as the first dumb scheduler technique.

In one embodiment, the invention is directed to a method of multiple access scheduling of a shared communications channel divided into multiple resource blocks. The method includes identifying high-interference resource blocks in the shared communications channel and receiving an allocation request of an end device or UE. The method further includes determining an error rate that would result from assigning the allocation request of the UE to a first portion of the shared communications channel having one or more high-interference resource blocks. The method also includes assigning the allocation request to the first portion of the shared communications channel having the one or more high-interference resource blocks if the error rate is less than or equal to an error rate threshold.

In another embodiment, a method of multiple access scheduling of a shared communications channel divided into multiple resource blocks includes: determining a set of candidate UEs for scheduling, each candidate UE corresponding to an allocation request, identifying high-interference resource blocks in the shared communications channel, selecting a first UE from the set of candidate UEs, determining an error rate that would result from assigning, to the first UE, a first portion of the shared communications channel having one or more high-interference resource blocks, and assigning, to the first UE, the first portion of the shared communications channel having one or more high-interference resource blocks if the error rate is less than or equal to an error rate threshold.

In a still further embodiment, a base station for wirelessly communicating with UEs via a shared communications channel divided into multiple resource blocks includes: a radio unit including a receiver and transmitter enabling wireless communication with the UEs, and a scheduler, implemented on a processor, including: a high-interference resource block identifier configured to identify high-interference resource blocks in the shared communications channel, an allocation request handler configured to determine a set of candidate UEs for scheduling, each candidate UE corresponding to a received allocation request, and select a first UE from the set of candidate UEs, an allocation error rate calculator configured to determine an error rate that would result from assigning, to the first UE, a first portion of the shared communications channel having one or more high-interference resource blocks, and a scheduling unit configured to assign, to the first UE, the first portion of the shared communications channel having one or more high-interference resource blocks if the error rate is less than or equal to an error rate threshold.

Figure 2:
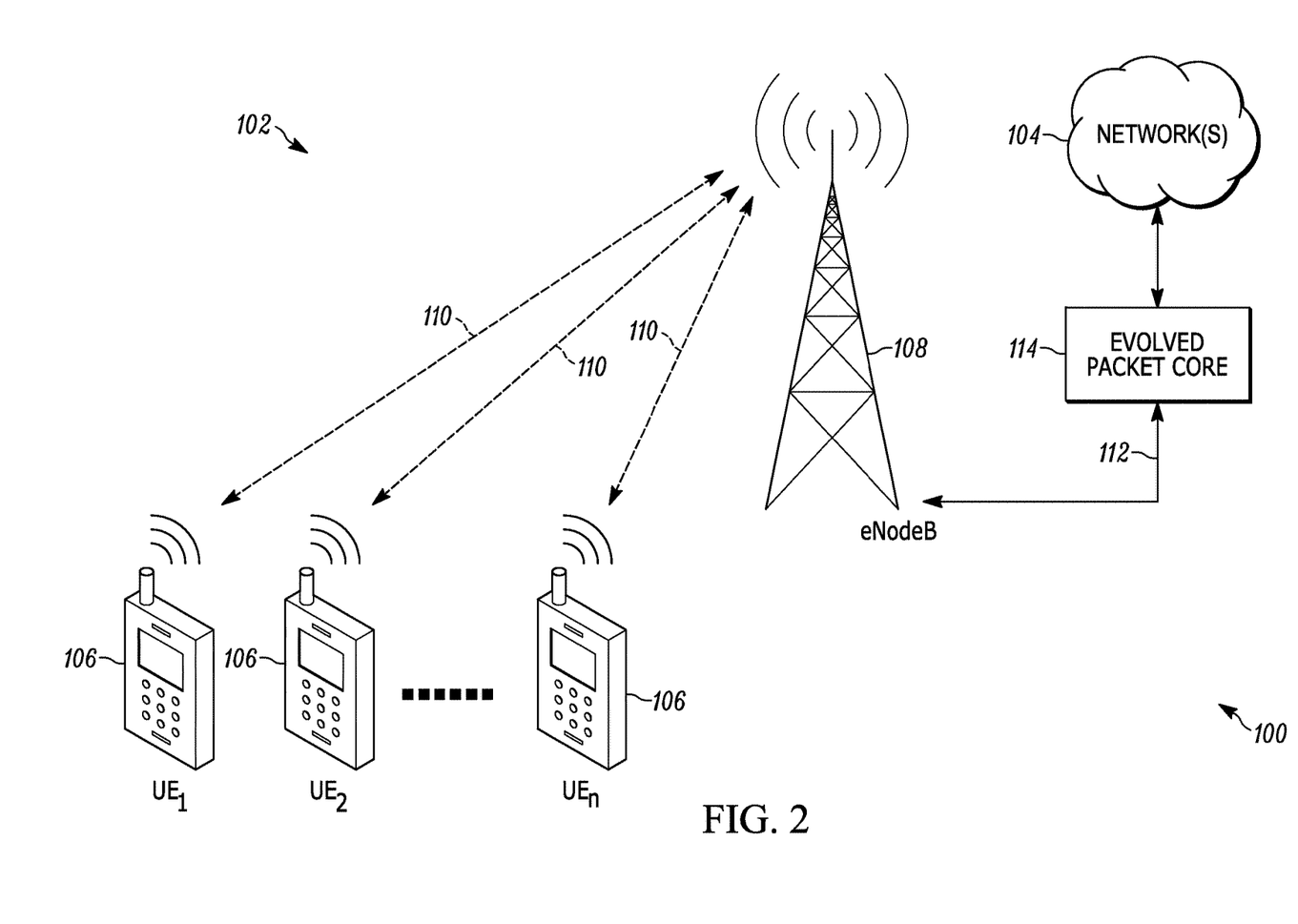
FIG. 2 illustrates a communication system including a radio area network (RAN) in accordance with some embodiments.

FIG. 2 illustrates a communication system 100 including a radio area network (RAN) 102 in communication with one or more networks 104. In certain examples described herein, it is assumed that the RAN 102 implements the Long Term Evolution (LTE) communication protocol, although the RAN 102 may implement other communication protocols in other embodiments of the invention. The RAN 102 includes one or more user devices, each of which will be referred to herein as user equipment (UE) 106. Each UE 106 may be, for instance, a smart phone, tablet, personal digital assistant (PDA), or another computing device. Such devices typically include, for instance, a processor, memory with software stored therein for execution by the processor, and a wireless communications module including an antenna via which the processor is operable to communicate wirelessly over the RAN 102.

Each UE 106 is operable to communicate wirelessly with a base station of the RAN 102. In the example illustrated, the base station is an enhanced NodeB or eNodeB 108. The eNodeB 108 includes one or more antennas and processing equipment as described in further detail with respect to FIG. 3. Communication between the UEs 106 and the eNodeB 108 occurs over wireless communication links 110, which may also be referred to as air interfaces 110. A communication link 110 via which data is transmitted from the eNodeB 108 to UEs 106 is known as a downlink, while a communication link 110 via which data is transmitted from UEs 106 to the eNodeB 108 is known as a uplink. A particular communication link 110 may act as an uplink, a downlink, or both at a given moment in time, and may switch between uplink and downlink functionality over time (e.g., frequently). LTE uses different air-interface technologies on the downlink and uplink. In particular, LTE employs a technology known as Orthogonal Frequency Division Multiple Access (OFDMA) on the downlink while employing a technology known as Single Carrier Frequency Division Multiple Access (SC-FDMA) on the uplink.

On the downlink, LTE defines several physical-layer data and control channels. The downlink physical-layer data channels are known as the physical broadcast channel (PBCH), the physical downlink shared channel (PDSCH), and the physical multicast channel (PMCH), while the downlink physical-layer control channels are known as the physical downlink control channel (PDCCH), the physical control format indicator channel (PCFICH), and the physical hybrid-ARQ (automatic repeat query) indicator channel (PHICH). The PDSCH is the primary traffic-bearing channel on the downlink. The PDSCH is used by the eNodeB 108 to transmit downlink transport blocks to various UEs 106, to which the eNodeB 108 is providing service.

On the uplink, LTE defines three physical-layer channels, known as the physical uplink shared channel (PUSCH), the physical uplink control channel (PUCCH), and the physical random access channel (PRACH). In general, the PUSCH is designated for carrying user data and some control information, the PUCCH is designated for carrying uplink-feedback data (e.g., media access control (MAC) uplink-feedback data) and requests to be scheduled for uplink user-data transmission, and the PRACH is designated for purposes such as initial UE access, service requests (i.e., switching from idle to active mode), and reestablishing uplink synchronization.

Although the eNodeB 108 is illustrated as part of a fixed radio tower in FIG. 2, the eNodeB 108 may be vehicle-mounted as part of an incident area network (IAN) (a type of RAN), for tactical or selective deployment.

The eNodeB 108 communicates with an evolved packet core (EPC) 114 via a communication link 112. The communication link 112 may include one or more communication devices, modems, nodes, networks, connections, switches, bridges, routers, and the like, and could make use of wired forms of communication, wireless forms of communication, or both. The EPC 114 includes network entities such as one or more mobility management entities (MMEs), one or more serving gateways (SGWs), one or more packet data network (PDN) gateways (PGWs), one or more home subscriber servers (HSSs), one or more access network discovery and selection functions (ANDSFs), one or more evolved packet data gateways (ePDGs), or a combination thereof. These network entities of the EPC 114 are configured and interconnected in a manner to provide wireless service to UEs 106 via the eNodeB 108 and to bridge the wireless service with the network(s) 104. The network(s) 104 include, for instance, a packet switched network (PSN) (e.g., the Internet) and a circuit-switched network (CSN) (e.g., the Public Switched Telephone Network (PSTN)).

Figure 3:
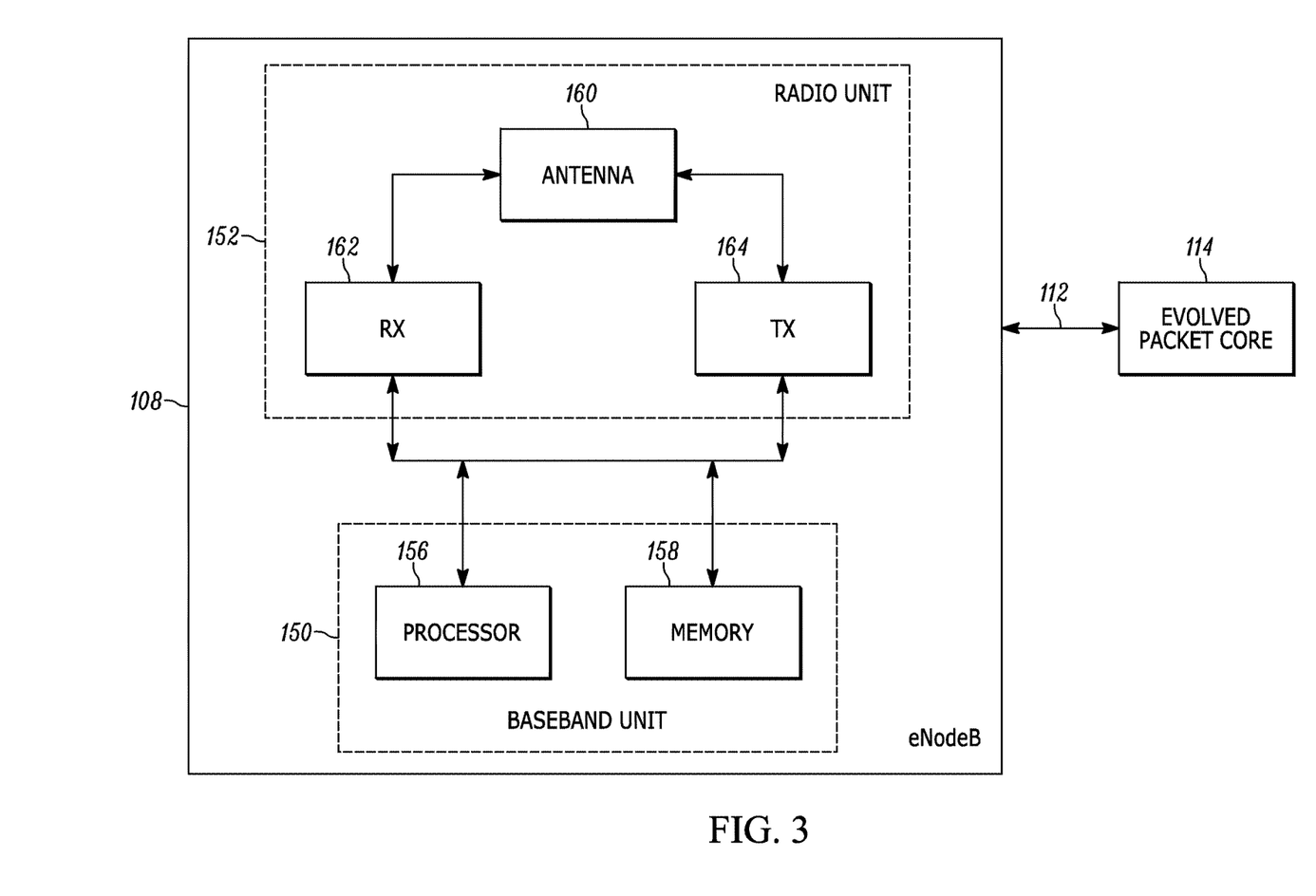
FIG. 3 illustrates a block diagram of an eNodeB base station in accordance with some embodiments.

FIG. 3 illustrates a block diagram of the eNodeB 108. In the embodiment illustrated, the eNodeB 108 includes a baseband unit 150, a radio unit 152, and a bus 154 that provides a communication link between the various components. Although only a single radio unit 152 and a single baseband unit are illustrated in FIG. 3, in practice, the eNodeB 108 may have more than one radio unit 152 and more than one baseband unit 150, and at ratios other than one-to-one. The baseband unit 150 includes a processor 156 and memory 158. The memory 158 includes operational data for use by the processor 156 and program instructions for execution by the processor 156 enabling the baseband unit 150 to control the radio unit 152 to communicate with UEs 106 and the EPC 114. Although a single processor 156 and memory 158 are illustrated, the baseband unit 150 may include two or more processors 156 and two or more memories 158 to implement the functionality of the baseband unit 150 described herein. The radio unit 152 includes an antenna 160, a receiver (Rx) 162, and a transmitter (Tx) 164. The antenna 160, receiver 162 and transmitter 164 enable the baseband unit 150 to communicate wirelessly with the UEs 106 via the wireless communication links 110. The receiver 162 and transmitter 164 may be separate units or part of a transceiver that both receives and transmits data.

As noted, in one exemplary implementation, the eNodeB 108 and UEs 106 use SC-FDMA technology for uplink communications. In the uplink communications, the wireless communication links 110 are divided in both frequency and time domains. On the LTE uplink, the division of the air interface in the frequency domain takes the form of the single uplink carrier being divided into a series of adjacent sub-carriers each having a bandwidth of 15 kilohertz (kHz). The uplink is demarcated into consecutive groups of 12 sub-carriers each, and it is these groups, called resource blocks (RBs), that form the smallest units of the uplink that can be allocated to a given UE 106 in the frequency domain. Thus, in this example, each RB has a bandwidth of 180 kHz and includes 12 sub-carriers each having a bandwidth of 15 kHz.

In the time domain, the LTE uplink is divided into 10-millisecond (ms) frames, each of which is divided into ten 1-ms sub-frames, where one such sub-frame forms the smallest unit of the uplink that can be allocated to a given UE in the time domain. Thus, the atomic unit of allocation on the LTE uplink is one RB for one sub-frame.

Figure 4:
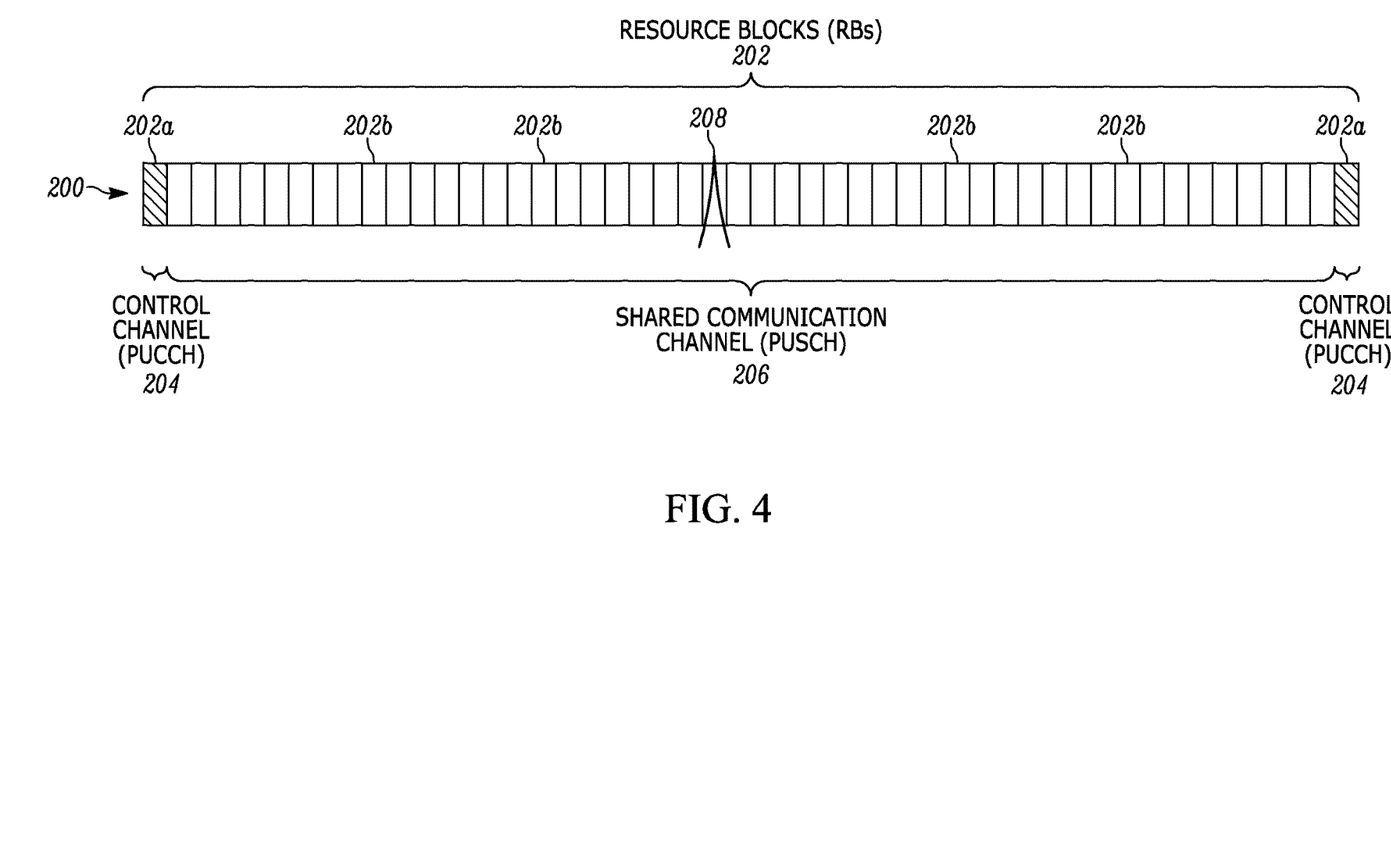
FIG. 4 illustrates an example sub-frame for LTE uplink communications in accordance with some embodiments.

FIG. 4 illustrates an example sub-frame 200 for LTE uplink communications between UEs 106 and the eNodeB 108. The illustrated sub-frame 200 includes fifty RBs 202. The first and last RB 202a are shown as control channels 204, which may be considered, e.g., a physical uplink control channel (PUCCH). The intervening forty-eight RBs 202b are used as a shared communication channel 206 and may be considered, e.g., the physical uplink shared channel (PUSCH), designated for carrying user data and some control information. The total number of RBs, the number of RBs designated for PUCCH, and the number of RBs designated for PUSCH are exemplary, and more or fewer RBs may be used for each in a sub-frame 200.

The sub-frame 200 includes a single instance of narrow band interference 208 located mid-band and at a level of, for example, −80 dBm at the antenna port. In this instance, the RB 202 over which the interference 208 is located would be considered a high-interference RB. The interference 208 may be caused by intentional interference (e.g., jamming) or unintentional interference. Unintentional interference sources may include direct in-band interference sources, such as legacy narrowband P25 devices including vehicle repeaters, wireless microphones, and broadcast television signals, among others. Unintentional interference sources may also include inter-modulation distortion (IMD) products between out-of-band sources falling in-band. Additionally, the interference at a given RB, such as interference 208, may include a noise component and an interference component, just a noise component, or just an interference component.

Figure 5:
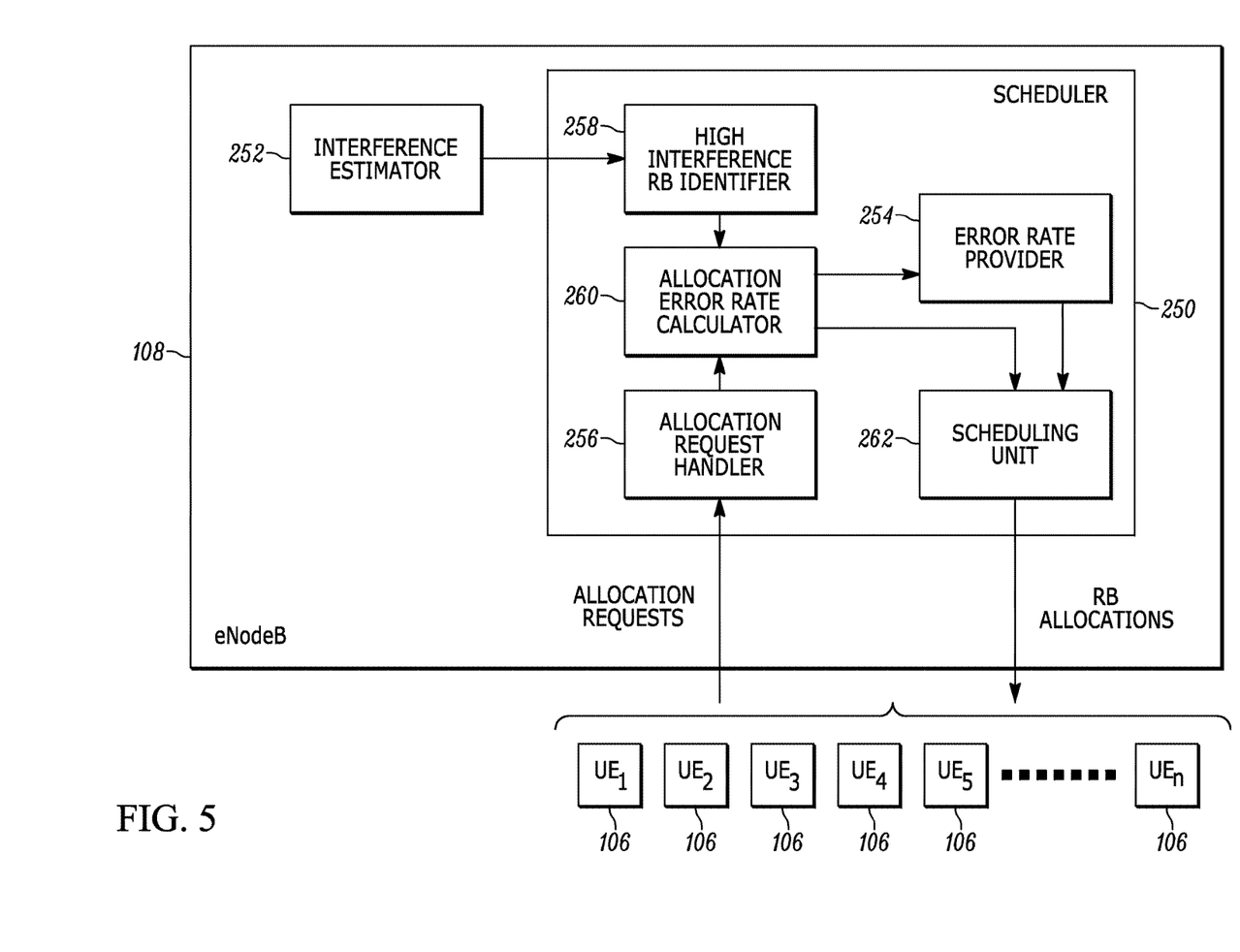
FIG. 5 illustrates a functional block diagram of an eNodeB base station in accordance with some embodiments.

FIG. 5 illustrates functional block diagram of the eNodeB 108. The baseband unit 150 and radio unit 152 are configured to implement the functions of the eNodeB 108 described with respect to FIG. 5. For example, operating instructions stored in memory 158 may, when executed by processor 150, and in cooperation with radio unit 152, perform one or more, or all, of the functionality described with respect to the functional block diagram set forth in FIG. 5.

The eNodeB 108 includes a scheduler 250 in communication with the UEs 106 and an interference estimator 252. The scheduler 250 receives allocation requests from UEs 106 and allocates RBs to UEs 106 to enable orderly communication over a shared communication band including the various communication links 110. For uplink communications on the PUSCH, each scheduled UE 106 is allocated a contiguous set of RBs 202b. In other words, a particular UE 106 is not, in one sub-frame, allocated some RBs 202b at one end of the channel 206 and some RBs 202b at the opposite end of the channel 206.

The scheduler 250 includes an error rate provider 254, an allocation request handler 256, a high-interference RB identifier 258, an allocation error rate calculator 260, and a scheduling unit 262. The allocation request handler 256 receives an allocation request from each UE 106 wanting to send data on an uplink channel. The allocation request handler 256 buffers and sorts received allocation requests and selects a set of candidate UEs 106 for scheduling, such as $UEs_{1-5}$.

The interference estimator 252 determines and provides an interference estimate for each of the RBs 202b in the shared communications channel 206. The high-interference RB identifier 258 receives the interference estimates from the interference estimator 252. The high-interference RB identifier 258 then identifies high-interference RBs in the channel 206 based on the received interference estimates. For instance, to identify high-interference RBs, the high-interference RB identifier 258, for each RB 202b, compares the interference estimate with an interference threshold. If the interference estimate for a particular RB 202b exceeds the interference threshold, the RB is deemed to be a high-interference RB by the high-interference RB identifier 258.

The interference threshold for a particular RB may be a value between about −110 dBm and −100 dBm per resource block, for instance, −100 dBm/RB, −103 dBm/RB, −107 dBm/RB, or −109 dBm/RB. For example, with −100 dBm/RB as the interference threshold, if the interference power level for a particular RB 202 is determined to be greater than −100 dBm/RB (e.g., −99 dBm/RB), the RB 202 is deemed to be a high-interference RB. Alternatively, the threshold may be expressed in a relative sense. For instance, the threshold may be an 18 dB interference rise relative to the receiver's thermal noise floor. Thus, an RB with an interference rise greater than 18 dB (e.g., 19 dB) would be considered a high-interference RB. Assuming a 3 dB noise figure level and a −121 dBm/RB noise floor for the eNodeB 108, an 18 dB/RB interference rise threshold would be essentially equivalent to the −100 dBm/RB threshold. In another alternative, the threshold is expressed as a signal-to-interference level threshold, which is selected based on the level of the desired signal.

The allocation error rate calculator 260 receives a candidate UE (e.g., $UE_1$) of the set of candidate UEs from the allocation request handler 256 and receives an indication from the high-interference RB identifier 258 of each of the RBs in the channel 206 identified as having high-interference. The allocation error rate calculator 260 then determines a block error rate that would result from allocating, to the candidate UE, a first portion of the channel 206 having one or more high-interference RBs.

This first portion is selected based on the allocation request of the candidate UE, the request indicating the scheduling requirements of the candidate UE (e.g., the number of bits to be allocated in the subframe) and the power headroom of the candidate UE. In one example, in selecting the first portion, the allocation error rate calculator 260 may first determine an ordinary RB allocation and modulation and coding scheme (MCS) level that would result without considering interference levels. This ordinary RB allocation is selected based on the scheduling requirements of the candidate UE and the power headroom of the candidate UE. The power headroom impacts the MCS level and number of un-interfered RBs that the UE would be allocated. Then, the allocation error rate calculator 260 modifies the ordinary RB allocation to arrive at the first portion by increasing the number of RBs to be allocated, including at least some high interference RBs, and lowering the MCS level.

The block error rate for a particular allocation depends on one or more of the power transmission level of the candidate UE, the number of RBs in the allocation, the number of high-interference RBs in the allocation, and a selected MCS level. The block error rate determined for the candidate UE is sent to the scheduling unit 262.

The allocation error rate calculator 260 also sends details of the proposed allocation for the candidate UE to the error rate provider 254. The error rate provider 254, in turn, determines an error rate threshold, also referred to as a target block error rate, for the proposed allocation based on the details. The error rate threshold is calculated based on one or more of the power transmission level of the candidate UE, the number of RBs in the allocation, and the number of high-interference RBs in the allocation, and a selected MCS level. The error rate provider 254 then sends the determined error rate threshold to the scheduling unit 262 directly or via the allocation error rate calculator 260.

The scheduling unit 262 then compares the determined block error rate for the candidate UE to the error rate threshold. If the determined block error rate is less than or equal to the error rate threshold, the scheduling unit 262 allocates the RBs 202b of the first portion of the channel 206 to the candidate UE. A certain level of error is desirable in communication systems that support retransmissions as it results in improved throughput. The allocation of RBs includes sending, to the candidate UE via a communication link 110, an identification of the RBs 202b being allocated.

If the determined block error rate is greater than the error rate threshold, the scheduling unit 262 does not allocate the first portion of the channel 206 to the candidate UE. Rather, the allocation request handler 256 selects a new candidate UE and provides it to the allocation error rate calculator 260 to restart the scheduling process with the new candidate UE. In other words, the scheduler 250 will allocate the first portion (or another portion) of the channel 206 having one or more high-interference RBs to the new candidate UE if the allocation would not exceed an error rate threshold. To schedule the new candidate UE, a new error rate that would result from the allocation for the new candidate UE is calculated by the allocating error rate calculator 260, a new error rate threshold may be calculated by the error rate provider 254 for the proposed allocation, and the scheduling unit 262 determines whether to allocate RBs 202b based on whether the new error rate threshold is exceeded.

The scheduler 250 continues to process allocation requests, attempting to schedule UEs to portions of the channel 206 having high-interference RBs first. Once the portions of the channel 206 having high-interference RBs are scheduled, and assuming RBs in the channel 206 remain unallocated, the remaining candidate UEs are allocated portions of the channel 206 having no high-interference RBs.

In some embodiments, if the determined block error rate is greater than the error rate threshold, the allocation error rate calculator 260 determines whether the candidate UE transmission power can be increased and, if so, whether the resulting error rate would then be below the error rate threshold. To do so, the allocation error rate calculator 260 determines the available transmission power headroom of the candidate UE, i.e., the difference between the current transmission power and the maximum transmission power of the candidate UE. The available transmission power headroom may be determined based on information within the allocation request from the candidate UE. If transmission power headroom is available, the allocation error rate calculator 260 then determines a new error rate that would result from increasing the transmission power of the candidate UE. The new error rate is sent to the scheduling unit 262, which again determines whether the error rate would be less than or equal to the error rate threshold. If the error rate is less than or equal to the error rate threshold, the scheduling unit 262 allocates the RBs to the candidate UE and, with the allocation, requests that the candidate UE increase its transmission power by the amount determined by the allocation error rate calculator 260. Alternatively, if the error rate still exceeds the error rate threshold, the scheduler 250 does not allocate the RBs to the candidate UE and proceeds scheduling as previously described.

Figure 6:
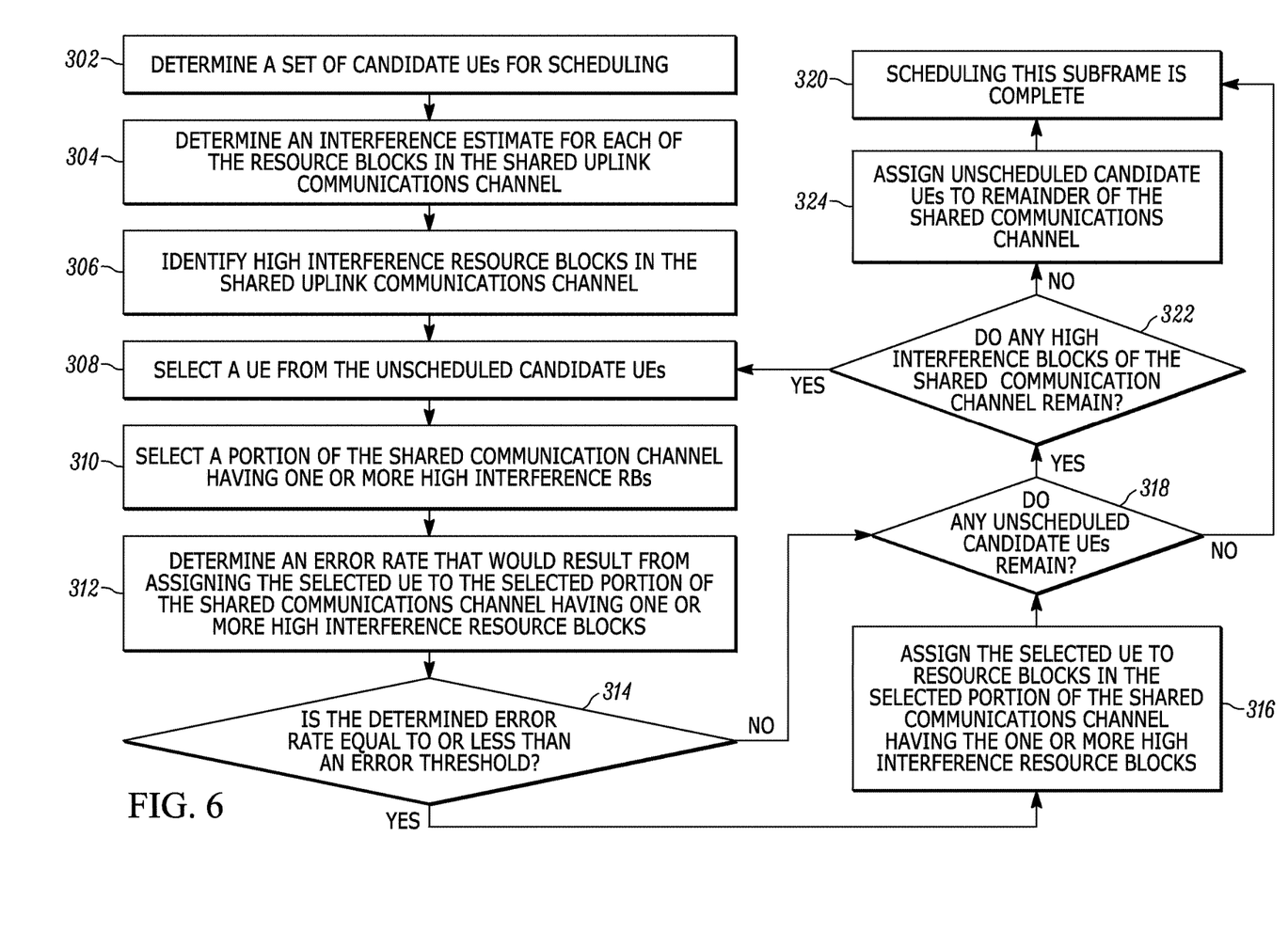
FIG. 6 illustrates a method of scheduling a shared communication channel in accordance with some embodiments.

FIG. 6 illustrates a method 300 of multiple access scheduling of a shared communications channel divided into multiple RBs (e.g., channel 206) carried out by the scheduler 250. In step 302, the scheduler 250 determines a set of candidate UEs for scheduling, e.g., using the allocation request handler 256. For instance, the allocation request handler 256 may determine the set of candidate UEs by selecting UEs (e.g., $UE_1$, $UE_2$, ... $UE_N$) that have recently sent allocation requests to the scheduler 250. In step 304, the scheduler 250 determines an interference estimate for each of the RBs in the shared uplink communications channel 206, e.g., using the output of the interference estimator 252. In step 306, the scheduler 250 identifies high-interference RBs in the shared uplink communications channel 206, e.g., using the high-interference RB identifier 258. In step 308, the scheduler 250 selects a yet-to-be scheduled (unscheduled) UE from the set of candidate UEs, such as $UE_1$. The scheduler 250 selects a candidate UE based on factors such as a size of $UE_1$'s request, a priority level of $UE_1$'s request, and the amount of time that has passed since the request was received by the scheduler 250. In step 310, the scheduler 250 selects a portion of the shared communication channel having one or more high interference RBs. In some instances, this step includes first identifying the number of RBs without a high interference level that would typically be allocated to $UE_1$ (e.g., "X") and the associated MCS level (e.g., based on the power headroom of the UE and number of bits to be allocated in that subframe). Then, the scheduler 250 increases that number by one or more RBs (e.g., two), and selects a contiguous section of the subframe having a size equal to the increased number of RBs (e.g., X+2). This selected contiguous section includes one or more high interference RBs and is the selected portion of step 310.

Also, the associated MCS level for the selected portion is set slightly lower than the previously identified MCS level.

In step 312, the scheduler 250 determines an error rate that would result from assigning the selected candidate $UE_1$ to the selected portion of the channel 206 having one or more high-interference RBs, e.g., using the allocation error rate calculator 260. In step 314, the scheduler 250 determines whether the error rate that would result from assigning the allocation request of the selected candidate UE to a first portion of the shared communications channel 206 having one or more high-interference RBs would be below an error rate threshold. If the error rate would be below the error rate threshold, the scheduler 250 assigns the selected candidate $UE_1$ to RBs in the first portion of the shared communications channel having the one or more high-interference RBs (step 316).

After assigning the $UE_1$ in step 316 or determining the error rate would exceed the error rate threshold in step 314, the scheduler 250 proceeds to step 318. In step 318, the scheduler determines whether any unscheduled candidate UEs remain (e.g., $UE_2$-$UE_N$). If no unscheduled candidate UEs remain, the scheduler 250 has completed scheduling of the particular subframe (step 320). If unscheduled candidate UEs remain, the scheduler 250 proceeds to step 322.

In step 322, the scheduler 250 determines whether any high-interference RBs remain unassigned in the shared communications channel 206. If RBs remain, the scheduler 250 proceeds to step 308 to select another yet-to-be scheduled UE from the set of candidate UEs and proceeds through the method 300 as previously described, but with the new candidate UE. For example, the scheduler 250 will determine whether to assign $UE_2$ to a second portion of the shared communication channel that has high interference RBs. If the scheduler 250 determines in step 322 that no high-interference RBs remain, the scheduler 250 proceeds to step 324 to assign remaining unscheduled candidate UEs to the remainder of the shared communications channel 206 that has no high-interference RBs. As the remainder of the shared communications channel 206 does not include high-interference RBs, the unscheduled candidate UEs are allocated RBs according to normal scheduling procedures (e.g., based on a priority level of the request, size of the request, and time of the request).

For instance, if we assume that unallocated RBs remain after the high-interference RBs are scheduled and that $UE_1$ was not allocated the first portion (or another portion having high interference RBs) because its associated error rate exceeded the error rate threshold, the scheduler 250 schedules $UE_1$ to a third portion of the channel having no identified high interference RBs in step 324. The third portion, having no high interference RBs, has less high interference RBs than the first portion of the channel that was originally attempted for allocating to $UE_1$.

Once the remainder of the candidate UEs are scheduled or the RBs in the channel 206 are assigned, the scheduling of the subframe is complete (step 320) and the assignments are communicated to the UEs (e.g., via wireless communication links 110). After scheduling of the subframe is complete and the assignments communicated to the UEs, the UEs communicate over the channel 206 according to the RB allocations by the scheduler 250. In other words, the eNodeB 108 receives uplinked data from the UEs 106 over the channel 206 and passes the data upstream to the EPC 114 (see FIGS. 1 and 2).

Figure 7A:
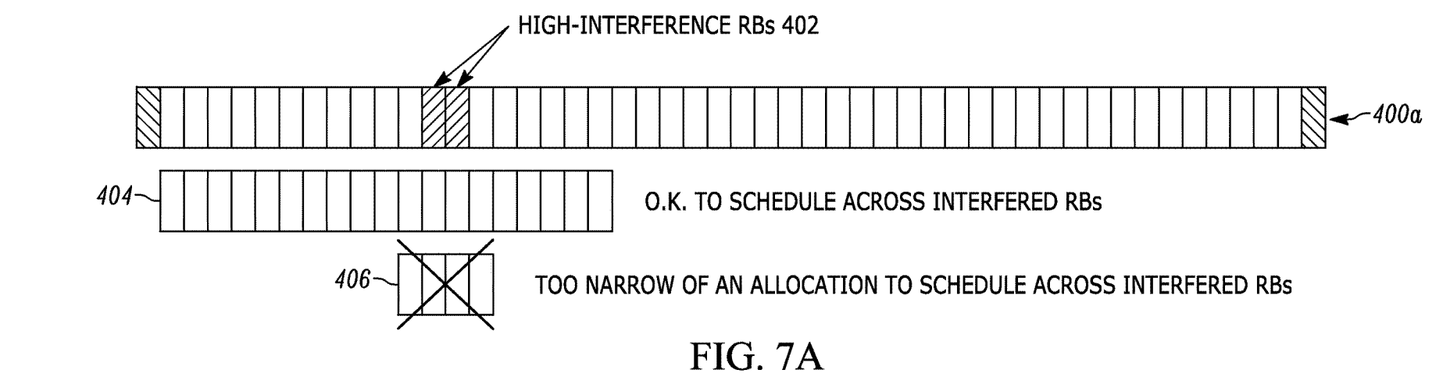
FIGS. 7A-C illustrates example end-device allocations of a shared communications channel in accordance with some embodiments.
Figure 7B:
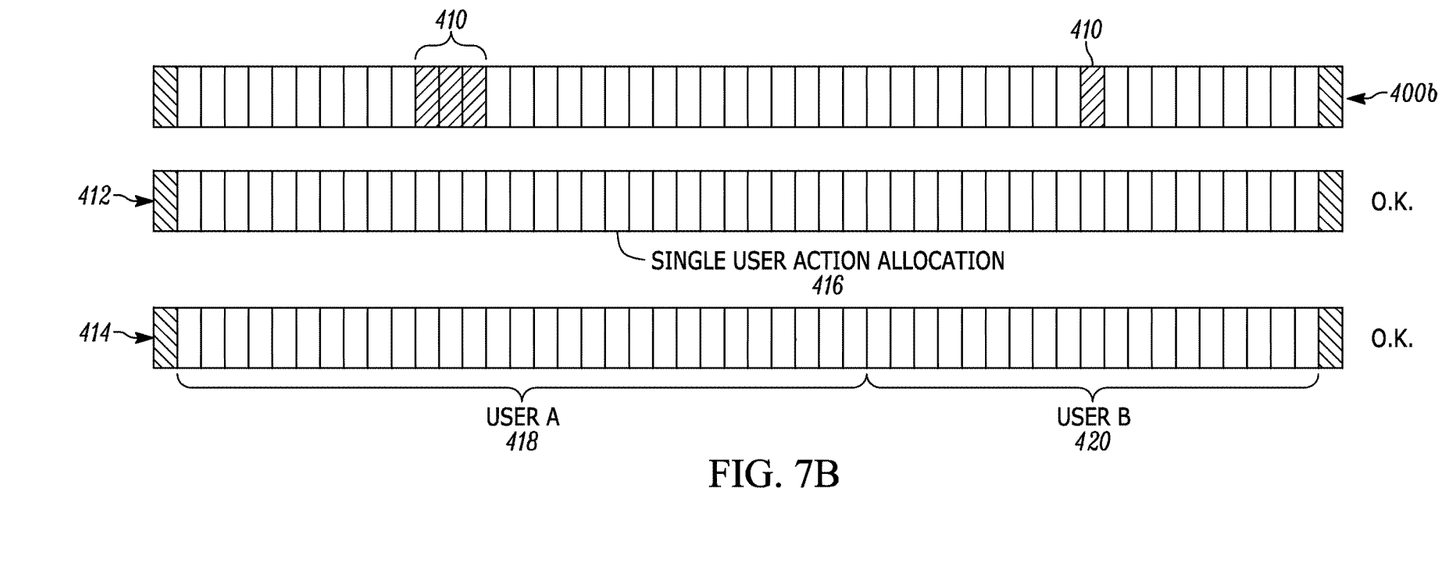
Figure 7C:
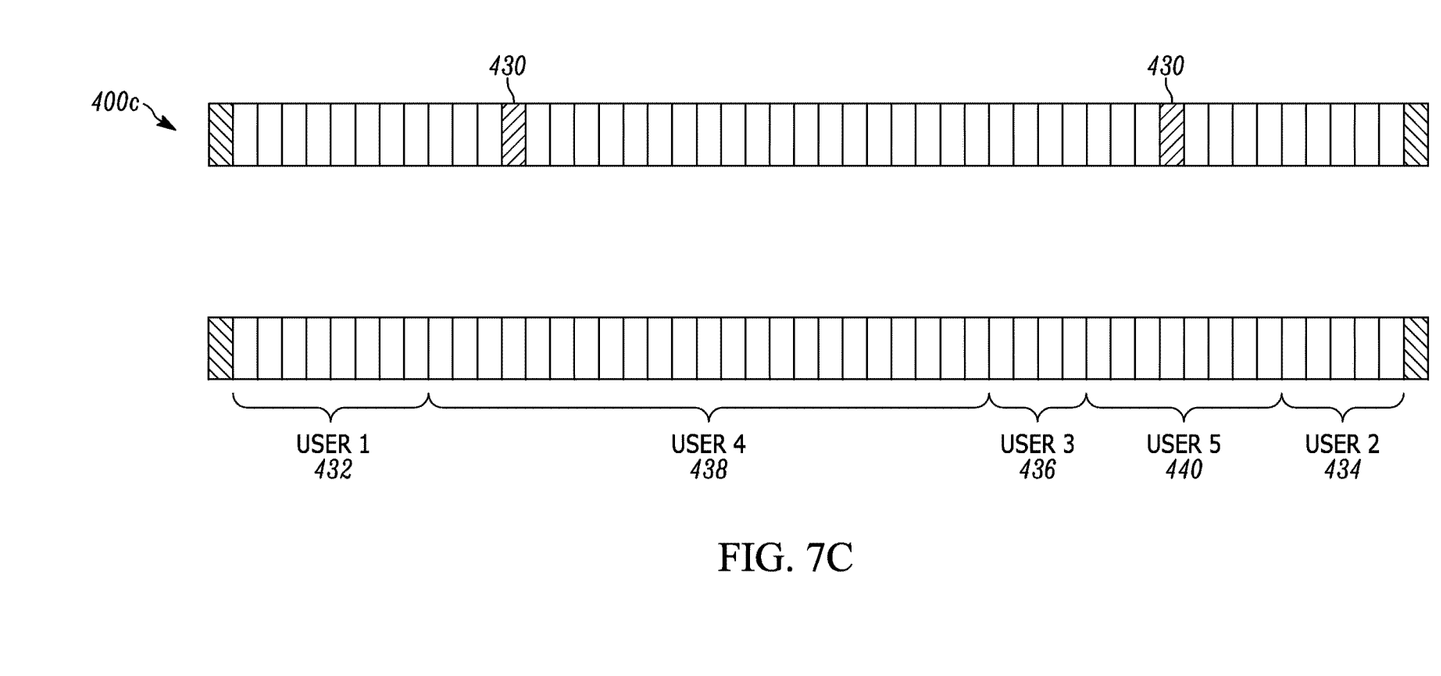

FIGS. 7A-C illustrate example shared communications channels 400a, 400b, 400c (akin to channel 206) and potential RB allocations for UEs 106 scheduled by the scheduler 250. FIG. 7A illustrates a shared channel 400a having two high-interference RBs 402 and two example UE allocations 404 and 406. The scheduling unit 262 schedules the UE allocation 404 after determining that the error rate for the allocation (as determined by the allocation error rate calculator 260) would not exceed the error rate threshold calculated by the error rate provider 254. If the scheduling unit 262 determines that the error rate for the allocation would exceed the error rate threshold, then the UE allocation 406 is not scheduled. At a later time, the UE allocation 406 may be scheduled to another portion of the shared channel 400a.

FIG. 7B illustrates a shared channel 400b having four high-interference RBs 410 and two example UE schedulings 412 and 414. For the scheduling 412, the scheduling unit 262 schedules the UE allocation 416 after determining that the error rate for the allocation would not exceed the error rate threshold calculated by the error rate provider 254. For the scheduling 414, the scheduling unit 262 schedules the UE allocation 418 to User A after determining that the error rate for the allocation would not exceed the error rate threshold. The scheduling unit 262 then schedules the UE allocation 420 to User B after determining that the error rate for the allocation would not exceed the error rate threshold.

FIG. 7C illustrates a shared channel 400c having two high-interference RBs 430 and the scheduling of five UEs to the shared channel 400c. The scheduler 250 may start with UE allocation 432 (for User 1) and attempt to schedule UE allocation 432 to a first portion of the channel 400c including one of the high-interference RBs 430. However, the scheduling unit does not schedule the UE allocation 432 to this first portion because the error rate exceeds the error rate threshold. The scheduler may attempt and determine not to schedule UE allocation 434 (for User 2) and 436 (for User 3) to the portions of the channel having the high-interference RBs 430, again, because the error rate for such allocations exceeds the error rate threshold. Thereafter, the scheduler 250 attempts and schedules the UE allocation 438 (for User 4) to a first portion of the shared channel 400c having one of the high-interference RBs 430. The scheduling of UE allocations 438 occurs because the corresponding error rate is below the error rate threshold. Thereafter, the scheduler 250 attempts and schedules the UE allocation 440 (for User 4) to a second portion of the shared channel 400c having the other high-interference RBs 430. Similarly, the scheduling of UE allocations 440 occurs because the corresponding error rate is below the error rate threshold. The scheduler 250 then returns to Users 1-3 and schedules the associated UE allocations 432, 434, and 436 to the remaining portions of the shared channel 400c.

Although the above scheduling techniques are primarily described with respect to a shared uplink channel in LTE communications (e.g., the PUSCH), the scheduling of user devices to portions of a shared communications channel having high-interference RBs is applicable to other shared communication channels divided into RBs, some of which may experience high-interference. For instance, the selective scheduling over high-interference RBs is also applicable to shared downlink channels in LTE, shared downlink channels in communication protocols other than LTE, shared uplink channels other than PUSCH in LTE, shared uplink channels in communication protocols other than LTE, and shared bidirectional channels, among other possibilities.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of multiple access scheduling of a shared communications channel divided into multiple resource blocks, the method comprising:
   identifying high-interference resource blocks in the shared communications channel;
   receiving an allocation request of a user equipment (UE) to allocate resource blocks to the UE in a first portion of the shared communications channel for future transmission of data;
   determining an error rate that would result from assigning the allocation request of the UE to a first portion of the shared communications channel having one or more of the high-interference resource blocks;
   assigning the allocation request to the first portion of the shared communications channel having the one or more of the high-interference resource blocks when the determined error rate would be less than an error rate threshold; and
   assigning the allocation request to a second portion of the shared communications channel having fewer of the high-interference resource blocks relative to the first portion of the shared communications channel when the determined error rate would be greater than the error rate threshold.

2. The method of claim 1, further comprising:
   determining an interference estimate for each of the resource blocks in the shared communications channel,
   wherein identifying high-interference resource blocks in the shared communications channel is based on the determined interference estimate.

3. The method of claim 1, further comprising:
   receiving a second allocation request of a second UE;
   determining a second error rate that would result from assigning the second allocation request of the second UE to a third portion of the shared communications channel having one or more high-interference resource blocks; and
   assigning the second allocation request to the third portion of the shared communications channel having the one or more high-interference resource blocks if the second error rate is less than or equal to a second error rate threshold.

4. The method of claim 1, wherein the shared communications channel is an uplink channel.

5. The method of claim 1, wherein assigning the allocation request includes sending, to the UE:
an indication of the first portion of the shared communications channel; and
a request to increase a power transmission level of the UE for use of the first portion of the shared communication channel.

6. The method of claim 1, further comprising
determining the error rate threshold based on a number of resource blocks of the first portion of the shared communication channel and a modulation and coding scheme proposed for the first portion of the shared communication channel.

7. A base station for wirelessly communicating with user equipment (UEs) via a shared communications channel divided into multiple resource blocks comprising:
a radio unit including a receiver and transmitter enabling wireless communication with the UEs; and
a scheduler, implemented on a processor, including:
a high-interference resource block identifier configured to identify high-interference resource blocks in the shared communications channel,
an allocation request handler configured to:
determine a set of candidate UEs for scheduling, each candidate UE corresponding to a received allocation request requesting allocation of resource blocks to the candidate UE in the shared communications channel for future transmission of data, and
select a first UE from the set of candidate UEs,
an allocation error rate calculator configured to determine an error rate that would result from assigning, to the first UE, a first portion of the shared communications channel having one or more of the high-interference resource blocks,
a scheduling unit configured to
assign, to the first UE, the first portion of the shared communications channel having the one or more of the high-interference resource blocks when the determined error rate would be less than an error rate threshold; and
assign, to the first UE, a second portion of the shared communications channel having fewer of the high-interference resource blocks relative to the first portion of the shared communications channel when the determined error rate would be greater than the error rate threshold.

8. The base station of claim 7, further comprising:
an interference estimator configured to determine an interference estimate for each of the resource blocks in the shared communications channel, and
wherein the high-interference resource block identifier is further configured to identify high-interference resource blocks in the shared communications channel based on the interference estimate for each of the resource blocks.

9. The base station of claim 7, further comprising an error rate provider configured to provide the error rate threshold to the scheduling unit, wherein the error rate provider determines the error rate threshold based on a number of resource blocks of the first portion of the shared communication channel, and a modulation and coding scheme proposed for the first portion of the shared communication channel.

10. The base station of claim 7, further wherein:
the allocation request handler is further configured to select a second UE from the set of candidate UEs;
the allocation error rate calculator is further configured to determine a second error rate that would result from assigning, to the second UE, a second portion of the shared communications channel having one or more high-interference resource blocks; and
the scheduling unit is further configured to assign, to the second UE, the second portion of the shared communications channel having one or more high-interference resource blocks if the error rate is less than or equal to a second error rate threshold.

11. The base station of claim 7, wherein the shared communications channel is an uplink channel between the UEs and the radio unit.

12. The method of claim 1, wherein determining the error rate that would result is determined as a function of one or more of a power transmission level of the UE, a number of resource blocks in the allocation request, a number of the high-interference resource blocks in the first portion of the shared communications channel, and a selected modulation and coding scheme level.

13. The method of claim 12, wherein determining the error rate that would result is determined as a function of at least the number of resource blocks in the allocation request, the number of the high-interference resource blocks in the first portion of the shared communications channel, and the selected modulation and coding scheme level.

14. The base station of claim 7, wherein the allocation error rate calculator is further configured to determine the error rate that would result as a function of one or more of a power transmission level of the UE, a number of resource blocks in the allocation request, a number of the high-interference resource blocks in the first portion of the shared communications channel, and a selected modulation and coding scheme level.

15. The base station of claim 14, wherein the allocation error rate calculator is further configured to determine the error rate that would result as a function of at least the number of resource blocks in the allocation request, the number of the high-interference resource blocks in the first portion of the shared communications channel, and the selected modulation and coding scheme level.

* * * * *